United States Patent
Walti et al.

(10) Patent No.: US 8,125,176 B2
(45) Date of Patent: Feb. 28, 2012

(54) MOTORIZED SYSTEM FOR CLOSING A BUILDING

(75) Inventors: Olivier Walti, Corbie (FR); Nils Casteras, Corbie (FR)

(73) Assignee: Bubendorff, Attenschwiller (FR)

( * ) Notice: Subject to any disclaimer, the term of this patent is extended or adjusted under 35 U.S.C. 154(b) by 645 days.

(21) Appl. No.: 12/298,601

(22) PCT Filed: Apr. 25, 2007

(86) PCT No.: PCT/FR2007/051169
§ 371 (c)(1),
(2), (4) Date: Dec. 19, 2008

(87) PCT Pub. No.: WO2007/125251
PCT Pub. Date: Nov. 8, 2007

(65) Prior Publication Data
US 2009/0151879 A1    Jun. 18, 2009

(30) Foreign Application Priority Data
Apr. 26, 2006   (FR) ..................................... 06 51467

(51) Int. Cl.
*H02P 27/06* (2006.01)
(52) U.S. Cl. .................... 318/747; 318/752; 318/759
(58) Field of Classification Search .................. 318/727, 318/739, 749, 751–759, 746, 747; 49/507; 160/1, 133, 168.1 P, 238, 309–311, 405, 903, 160/904
See application file for complete search history.

(56) References Cited

U.S. PATENT DOCUMENTS

| | | | | |
|---|---|---|---|---|
| 3,993,940 A * | 11/1976 | Volk, Jr. | | 318/747 |
| 4,078,192 A * | 3/1978 | Fultz | | 318/799 |
| 4,080,554 A * | 3/1978 | Nordby | | 318/808 |
| 4,140,950 A * | 2/1979 | Volk, Jr. | | 318/749 |
| 4,774,448 A * | 9/1988 | Yoshitomi | | 318/746 |
| 5,368,116 A | 11/1994 | Iijima et al. | | |
| 5,767,653 A * | 6/1998 | DeFiore et al. | | 318/811 |
| 5,847,525 A | 12/1998 | Cheron et al. | | |
| 7,538,504 B2 * | 5/2009 | D'Ayot | | 318/280 |
| 7,692,398 B2 * | 4/2010 | Bruno | | 318/751 |
| 7,746,015 B2 * | 6/2010 | Bruno | | 318/466 |
| 2010/0052599 A1 * | 3/2010 | Nagai et al. | | 318/766 |

FOREIGN PATENT DOCUMENTS

| | | |
|---|---|---|
| EP | 0 833 435 A1 | 4/1998 |
| EP | 1 538 735 A1 | 6/2005 |
| JP | 60-121971 A | 6/1985 |
| JP | 61-214794 A | 9/1986 |
| JP | 11-150966 A | 6/1999 |

OTHER PUBLICATIONS

International Search Report of PCT/FR2007/051169, date of mailing Sep. 21, 2007.

* cited by examiner

*Primary Examiner* — Bentsu Ro
(74) *Attorney, Agent, or Firm* — Westerman, Hattori, Daniels & Adrian, LLP

(57) ABSTRACT

The invention relates to a motorized system for closing a building, of the roller shutter type with the particular feature that it has a two-phase asynchronous motor which comprises two windings (2; 3) and is combined with a speed-varying device (5).

14 Claims, 1 Drawing Sheet

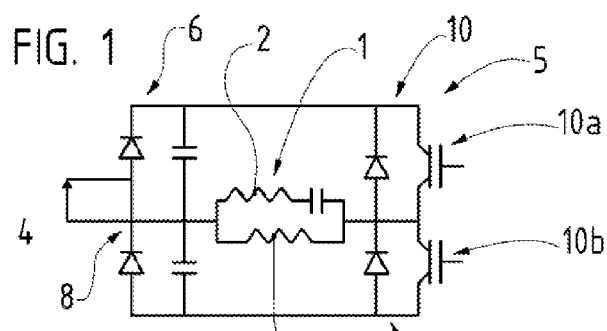
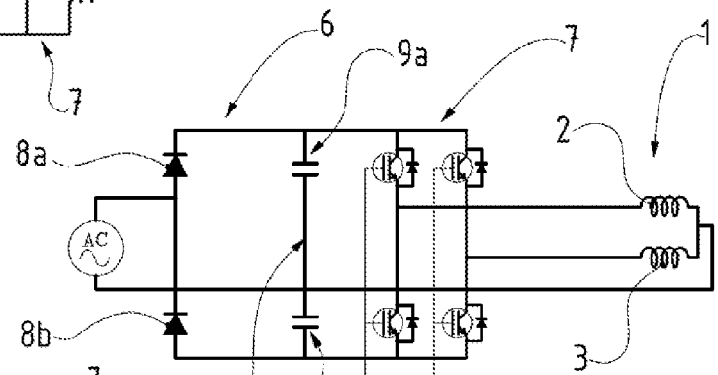
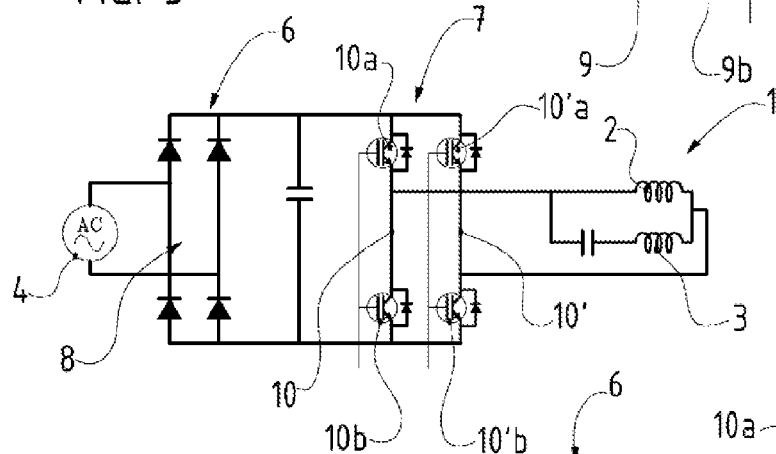
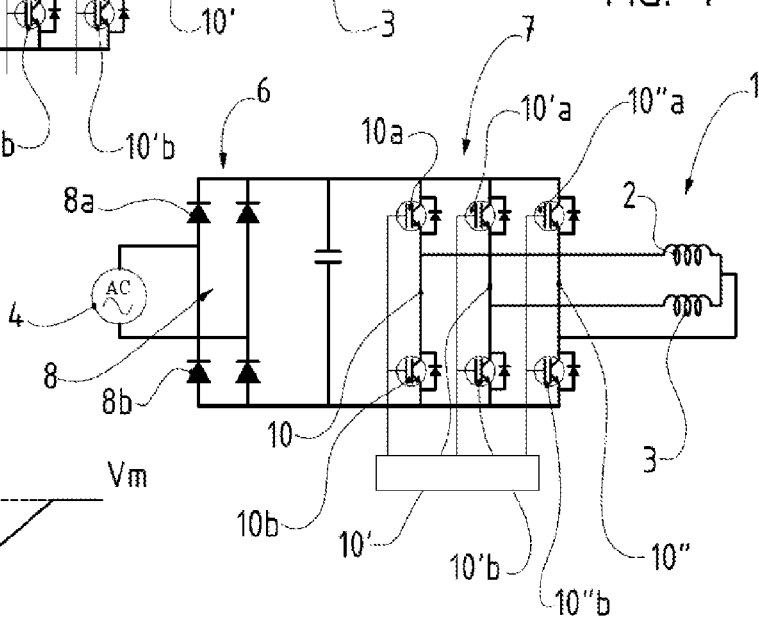
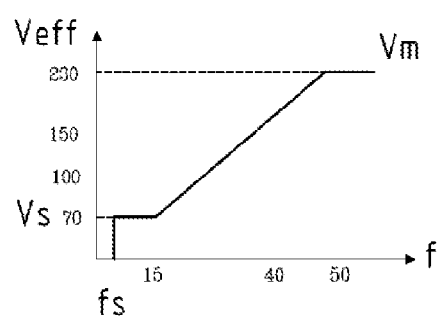

MOTORIZED SYSTEM FOR CLOSING A BUILDING

BACKGROUND OF THE INVENTION (1) Field of the Invention

The invention relates to a two-phase asynchronous motor device for driving systems for closing a building, of the roller shutter type.

The present invention relates to the field of the systems for closing a building and in particular to roller shutters and their motorization.

(2) Description of the Prior Art

Many motorized systems for closing a building, which are in addition associated with remote-control devices facilitating the control of their opening and closing, are already known.

In the particular field of the roller shutters, the driving motor is of the tubular type, so as to be positioned inside the winding-up tube onto which the apron of the roller shutter is designed capable of winding up.

This is usually an asynchronous motor with a phase-shift capacitor including a main winding and a secondary winding allowing not only reversing the direction of rotation of the motor, but in addition, through the phase shift of the current generated by the capacitor, generating a driving torque at the level of the rotor of this motor. The secondary winding is preferably different from the main winding in that it has a different resistance and inductance and thus facilitates the starting of the motor.

Because of manufacturing constraints, some manufacturers design imperfect single-phase motors with a secondary winding, which is identical to the main winding. This obliges them to use a larger capacitor, which gets hotter. Obviously, the encapsulation of such a motor in a casing made out of synthetic insulating material and its installation inside a winding-up tube of a roller shutter do not facilitate the evacuation of the calories produced.

Turning back to the operation of this type of motor, the stator currents create a rotary magnetic field in the stator, while the rotor is comprised of short-circuited leads through which pass currents induced by the stator magnetic field.

The starting torque of such an asynchronous motor with a capacitor depends on the value of the latter. Anyway, this type of motor operates optimally, under nominal current-supply conditions, only beyond a determined speed of rotation.

This being said, within the framework of their application to roller shutters, it should be noted that, though nearly no power is required for unwinding an apron of such a roller shutter and that a lower starting torque is enough, since only the inertia during the rotation of the winding-up tube of the apron has to be overcome, the problem is different during the winding-up.

Of course, when the apron of the roller shutter is fully unfolded and the openings between the hinged slats forming said apron are closed, the load to be driven by the motor during the first turns of rotation is lesser and the torque to be produced is itself reduced. However, when this roller-shutter apron is in a partially, even nearly fully unfolded situation, without the openings between the slats being closed, the control to wind up the roller shutter results, under such circumstances, into heavily loading the motor. In this case, this motor should be capable of producing a high starting torque in order to overcome the reverse torque the weight of the apron exerts onto the winding-up tube.

It is therefore usual, in this field of application of the roller shutters, to use motors with a nominal power much higher than the power that is normally required.

Though this results into an extra cost, it also results into the usefulness of making use of a plurality of motors with different powers to cover the full range of roller shutters one wants to motorize.

In addition, the extra power of the motor, which is finally useful only during the starting phase, i.e. during a transient phase in which the motor does not operate in an optimal way, results into heavily loading the mechanical elements of the roller shutter, whether in the event of an unexpected blocking or in the event of a control to stop the operation.

It is in particular usual to ensure the stoppage of the motor, at the travel end for unwinding or winding-up the apron of the roller shutter, for example through measuring the phase shift between current and voltage. This phase shift results from an increase of the load applied to the motor, which results, in this case, from the arrival at the lower of upper travel end of the apron. Under such circumstances, one understands very well that, before the interruption of the current supply to the motor occurs, the latter exerts an excessive strain on the mechanical elements of the roller shutter, due to its overdimensioning.

It should also be noted that this type of motor is usually provided with an electromagnetic brake operating in the absence of current. Of course, the higher the power of the motor, the more this brake is loaded and must be oversized accordingly.

Besides this low starting torque produced by an asynchronous motor with main and secondary windings, this under nominal current-supply conditions, in this case a nominal voltage of 230 Volts and a frequency of 50 Hertz, there is also the problem of the network-voltage variation. In other words, this voltage of the current-supply network of a dwelling is not constant and equal to the nominal value of 230 Volts, but can vary. In particular, it can be lower than this nominal voltage and, in such a case, the starting torque such an asynchronous motor is likely to produce has a tendency to quickly decrease.

In particular, it could be noted that below a voltage of 180 Volts the motor is often unable to start. Therefore, this variable of the supply voltage of the motor should also be taken into consideration for the dimensioning of the latter.

Finally, if one takes into consideration all the strains the motorization of a roller shutter represents, one must necessarily conclude that a three-phase motor should be used.

Furthermore, as soon as one wants a motor with certain performances or one wants to meet particular constraints, a balanced three-phase motor is systematically used, which a power converter in the form of a speed-varying device is usually associated with, so that all these requirements can be met.

However, for such an application of a three-phase motor with speed variation to a roller shutter, the specialist in the art can only observe that he is facing an unavoidable or nearly unavoidable requirement, namely the maximum cross-section the tubular motor can adopt for its accommodation in the winding-up tube of the roller shutter.

The three-phase motor has indeed too large a cross-section to allow such an installation. Of course, it can be contemplated to increase this cross-section of the winding-up tube, but this results into a larger cross-section of the roller-shutter apron when wound up, thus of the box in which this roller-shutter mechanism unit is accommodated, in addition to the fact that the implications at the level of such a building for the latter to be able of receiving such oversized boxes. For example, their installation in the thickness of a wall can be made impossible. An installation against the inner side of a building causes this voluminous box to be more protruding into the dwelling. In the event of a renewal, a thicker box reduces accordingly the surface for the passing through of light at the level of a window. This is completely contrary to the current tendency consisting in making the box of a roller shutter as discrete as possible and in facilitating its integration into a building.

Another solution consists in placing such a three-phase motor at an end of said winding-up tube, instead of integrating it into the latter. This also results into a lateral extension of the box of the roller shutter corresponding to the additional size created by this motor, which of course results into specific arrangements to be foreseen at the level of the building.

As can be observed, the three-phase motor, though it is perfectly adapted for driving a roller-shutter apron, could not be used in this field of application, because of unavoidable dimensional constraints.

Therefore, the specialist in the art has systematically turned towards the only motor he thought capable of technically and economically solving the problems of the motorized driving of the roller shutters, namely the single-phase asynchronous motor with a capacitor.

SUMMARY OF THE INVENTION

The aim of the present invention consists not only in improving, but in optimizing the operation of the motorized closing systems of the type roller shutter, this through an asynchronous motor with two windings, with which motor is associated a speed-varying device in the form of a power converter resulting, for determined characteristics, into substantially increasing the starting torque these motors should normally produce under the influence of a phase shift created between the main winding and the secondary winding through a simple capacitor.

In brief, it is within the framework of a real inventive step, which is contrary to the prejudices and customs of the specialist in the art, who thinks that, since he cannot use a three-phase motor, he has no other choice than to use a single-phase asynchronous motor with a capacitor for driving a roller shutter or a similar system, that there has been devised to ensure this driving thanks to a two-phase asynchronous motor the operation of which is controlled by a speed variator in order to meet all the torque constraints the driving of a roller-shutter apron represents in all possible situations of opening or closing.

So far, no speed variator has been associated with a two-phase asynchronous motor, since this type of motor has always been considered as being a low-cost one for applications in which the use of a motor overdimensioned with respect to its function had nearly no consequence for the total cost of the thus motorized object or installation.

As a matter of fact, when taking into consideration the consequences of an over-motorization in the field of application considered, namely the systems for closing a building of the type roller shutter, this use of a two-phase asynchronous motor combined with a speed-varying system represents a number of prejudices that have been overcome by the specialist in this field, the more that it results into non insignificant advantages, which will become clear in the following part of the description.

According to a preferred embodiment, the speed variation is based on the principle of a scalar control aimed at causing the frequency of the current supply to vary while maintaining substantially constant the ratio between the efficient voltage and the frequency, in order to achieve a constant flow in the machine and, hence, to maintain constant the function connecting the value of the torque to the sliding for any supply frequency whatsoever.

In particular for a motor with an integrated electromagnetic brake, there has also been devised, in a second inventive step, to control the operation of the motor according to this constant or substantially constant function of the voltage against the frequency, except at the limits, in particular in an initial starting phase where the voltage is chosen different from zero. In fact, this voltage is equal to a threshold value defined sufficient to ensure the release of this electromagnetic brake, which these motors can be provided with in their application to these systems for closing a building, of the type roller shutter.

Further objectives and advantages of the present invention will become clear when reading the following description, which refers to embodiments given by way of an indication and as non-restrictive ones.

BRIEF DESCRIPTION OF THE DRAWINGS

The understanding of this description will be facilitated when referring to the attached drawings, in which:

FIG. 1 is the synoptic view of an asynchronous motor with two identical windings and supplied with current through a speed-varying device according to a first embodiment;

FIG. 2 is a similar representation corresponding to a second embodiment;

FIG. 3 is a representation similar to FIG. 2, showing a third embodiment;

FIG. 4 is an illustration similar to FIGS. 1 and 2 corresponding to a third embodiment of the invention;

FIG. 5 represents in the form of a graph the control of the speed variation of the motor through a constant ratio between the efficient voltage and the frequency, over at least one range of this variation.

DETAILED DESCRIPTION OF THE PREFERRED EMBODIMENTS

The present invention relates to the application of a two-phase asynchronous motor for driving devices for closing a building, of the type roller shutter. It also relates to a closing device, namely a roller shutter provided with the asynchronous motor according to the invention.

In particular, according to the invention, the asynchronous motor 1, as schematically shown in the figures, is of the two-phase type and includes two preferably, but not necessarily, identical windings 2, 3. These windings 2, 3 are connected, through a speed-varying device 5, to the current-supply network 4, for example of a dwelling, which supply is of a conventional type with alternating current, for example with a nominal voltage of 230 Volts and a frequency of 50 Hertz.

Advantageously, this speed-varying device is with a scalar control, i.e. designed capable of ensuring a constant voltage-frequency ratio $V_{eff}/f$ over at least one determined range of this variation.

According to an embodiment, this device 5 is in the form of a power converter comprised of a rectifier 6 and an inverter 7.

As regards the rectifier 6, in a first simplified embodiment shown in FIG. 1, it is defined by a bridge 8 with two diodes 8a, 8b, with which is associated a capacitive divider 9 comprised of a first 9a and a second capacitor 9b connected in series to the terminals of the bridge 8. While the inverter 7 is formed of a switching cell 10, also connected to the terminals of the diode bridge 8 and including two power switches connected in series, of the IGBT or MOS type, 10a, 10b, ensuring the slicing, at the desired frequency, of the rectified current at the outlet of the rectifier 6, in order to ensure the current-supply to the motor 1. To the middle point of this cell, between both switches, are connected the two windings 2 and 3, this through a phase shift capacitor 11.

In order to allow omitting this phase shift capacitor 11, the control of the inverter 7 imposes the quadrature of the supply currents to the motor 1. This design leads to using two switching cells 10, 10' connected to the terminals of the diode bridge 8 and each comprised of 2 power switches 10a, 10b, 10'a, 10'b, as can be seen in FIG. 2. Each one of the windings 2 and 3 is connected to the middle point of a switching cell 10, 10', respectively.

Advantageously, the inverter 7, thus the switches, is controlled in pulse-width modulation, referred to as MLI control, which, under the inductive effect of the motor 1, results into smoothing the stator currents and into making sinusoidal the currents flowing through the two windings 2, 3 of the motor 1. It should be noted that the 90° phase shift of the current-supply to these windings 2, 3 is ensured at the level of the control. Hence, this is clearly a two-phase motor.

The use of a rectifier 6 defined by a simple bridge 8 with two diodes 8a, 8b, which a capacitive divider 9 is associated with, leads to feeding the terminals of the power switches with a direct voltage Ve=2×230×√2, i.e. 650 Volts, starting from an alternating network current-supply of 230 Volts.

In order to cope with this problem and as shown in FIG. 3, the rectifier 6 should use a conventional bridge 8 with for diodes 8a, 8b, 8c, 8d and one single associated filtering capacitor 12. The supply voltage is then reduced by half, Ve=230√2=325V. The voltage constraint on each transistor is therefore reduced by half.

In such a mounting, the switching operations of the transistor of the IGBT power switches 10a, 10b; 10'a, 10'b can create important voltage variations likely to disturb the electromagnetic environment, since the windings 2, 3 are directly connected to the network 4 and permit disturbances to arrive directly at the level of the latter.

In order to cope with this drawback and as shown in FIG. 4, a three-phase inverter 7 can be used, which differs from the embodiment of FIG. 3 through the connection of the windings 2 and 3 of the motor 1, which, instead of being connected directly to the rectified source 4, are connected to a third switching cell 10" of the inverter 7. This third cell 10" in parallel with two further cells includes, like in the case of the latter, two IGBT or MOS power switches 10"a, 10"b, between which the windings 2, 3 are connected.

According to a particular feature of the invention, though the speed-varying device 5 is with a scalar control in order to maintain, during this variation, a substantially constant ratio between efficient voltage and frequency, this is the case only within a range beyond a threshold voltage Vs and, preferably, until a predefined maximum voltage $V_M$, as the graphic of FIG. 5 wants to show schematically.

This feature is in particular interesting when the motor is provided with an integrated electromagnetic brake operating in the absence of current and the release of which has to be ensured in the initial starting phase. In particular, during this initial starting phase, a threshold voltage Vs is applied to the motor for a determined supply frequency fs, in order to ensure, right from the initial phase of current-supply to the motor 1, the release of the electromagnetic brake. Then, the frequency (as the case may be, the voltage) is caused to increase until the V/f ratio reaches the value of the constant one wants to maintain during the speed variation. Beyond the latter, the voltage and the frequency increase simultaneously.

This first starting step is shown by means of the flat line 13 on the curve of the graph of FIG. 5.

Advantageously, this constant value of the $V_{eff}/f$ ratio is equal to the value of the efficient voltage on the network 4 at the nominal frequency of this network, i.e. for example 230 Volts/50 Hertz.

As also shown by this graph, trials could show that a supply voltage of at least 10 Volts, preferably in the range of 50 to 70 Volts, allowed achieving the release of the electromagnetic brake.

As a matter of fact, one advantage deriving from the present invention consists in that this brake-calling force is much higher, due to a lower frequency during starting, compared to a motor fed directly through the network.

Therefore, this electromagnetic brake, which is a part subject to substantial wear in the current motors, can very easily be optimized in this case.

In particular, it can be enhanced as to its design, so as to achieve not only a longer lifetime, but mainly in order to react with less inertia and to achieve a better locking of the driving mechanism of a roller shutter, of course for a higher safety.

Advantageously, the maximum supply voltage $V_M$ of the motor 1 beyond which the $V_{eff}/f$ ratio is no longer maintained constant corresponds to the efficient value of the voltage of the current-supply network 4, for example 230 Volts. It should however be noted that any value can be chosen for this voltage $V_M$, and that the present invention is in no way limited to it.

In comparison, as regards the frequency variation, since it depends on the control for switching the power switching, it can largely exceed the frequency of the network.

It should be noted in this respect that, since, at a network supply of the type 230 Volts 50 Hertz, the asynchronous motors with main and secondary windings and provided with only one pair of poles were necessarily subjected to a speed of rotation of 3,000 rev/mn, the speed-varying device 5 according to the invention, leading to a higher torque through a lower speed of rotation, permits to contemplate subjecting these motors to a lower maximum speed of rotation, for example in the range of 1,500 rev/mm.

This results into a substantial reduction of the magnetic and mechanical vibrations with, here too, an inertia gain at the level of the reactivity of the electromagnetic brake and less slipping. To this should be added that the advantages of the present invention allow a lower reduction ratio, thus a higher mechanical efficiency.

Finally, it should also be observed that the speed-varying device according to the invention permits, during the various phases of the control of a closing system of the type roller shutter for its opening and closing, to carry out decelerations and accelerations, thus avoiding the noises due to a sudden change, in particular due to a sudden stoppage.

This advantage obviously results into applying a lesser load to the mechanical organs, the lifetime of which is therefore improved.

Though it meets the constraints related to the driving of namely roller shutters, this two-phase asynchronous motor can take a tubular shape, so as to be capable of being accommodated in a winding-up tube for the apron of such a roller shutter. This motor, with performances comparable to those of a three-phase motor, does indeed not have the size of the latter and keeps the dimensions corresponding to a single-phase asynchronous motor with a phase-shift capacitor.

As clearly appears from the preceding description, the present invention provides substantial progresses in the field of the motorization of the systems for closing a building of the type roller shutter.

What is claimed:

1. Motorized system for closing a building, of the type roller shutter, which includes:
   a two-phase asynchronous motor comprising two windings and which is associated with a speed-varying device, and
   a roller shutter which is actuated by the two-phase asynchronous motor,
wherein the asynchronous motor is associated with an electromagnetic brake, and
the speed-varying device subjects said motor, at least during an initial starting phase of the motor, to a fixed threshold voltage Vs which is more than zero and a fixed supply frequency fs which is more than zero and determined so as to release the electromagnetic brake; and
beyond this initial phase, the speed-varying device causes at least one of the voltage and the frequency to vary, until a constant ratio to be maintained between the efficient voltage and the frequency is reached.

2. Motorized system for closing a building, of the type roller shutter, according to claim 1, wherein the speed-varying device, in the form of a power converter, is with a scalar control designed capable of ensuring the constant ratio between the efficient voltage and the frequency $V_{eff}/f$ over at least one determined range of the variation.

3. Motorized system for closing a building, of the type roller shutter, according to claim 1, wherein the speed-varying device is designed capable of maintaining the constant ratio between the efficient voltage and the frequency, until a predefined maximum voltage $V_M$ is reached.

4. Motorized system for closing a building, of the type roller shutter, according to claim 3, wherein the constant ratio between the efficient voltage and the frequency is equal to the tension efficient voltage at the frequency of the current-supply network to which the motor is connected.

5. Motorized system for closing a building, of the type roller shutter, according to claim 4, wherein the predefined maximum voltage $V_M$ is equal to the efficient voltage of the current-supply network for the motor.

6. Motorized system for closing a building, of the type roller shutter, according to claim 1, wherein the speed-varying device comprises a power converter comprising a rectifier with diodes and an inverter with power switches of the IGBT or MOS type.

7. Motorized system for closing a building, of the type roller shutter, according to claim 6, wherein the rectifier is formed by a bridge with four diodes, while the inverter is formed by two switching cells connected to the terminals of the diode bridge and including two power switches in series, of the IGBT or MOS type, each one of the primary and secondary windings being connected to the middle point of a switching cell, respectively.

8. Motorized system for closing a building, of the type roller shutter, according to claim 7, which includes a third switching cell comprised of two power switches in series between which the primary and secondary windings are connected.

9. Motorized system for closing a building, of the type roller shutter, according to claim 1, wherein the windings are identical.

10. Motorized system for closing a building, of the type roller shutter, according to claim 1, wherein the windings are not identical.

11. Motorized system for closing a building, of the type roller shutter, according to claim 1, wherein the two-phase asynchronous motor is of the tubular type, so as to be capable of being accommodated in a winding-up tube for a roller-shutter apron.

12. Motorized system for closing a building, of the type roller shutter, according to claim 1, wherein, beyond the initial starting phase, said speed-varying device causes the frequency to vary until the value of the constant to be maintained for the ratio between the efficient voltage and the frequency is reached.

13. Motorized system for closing a building, of the type roller shutter, according to claim 12, wherein, in the starting phase, after the constant value is reached, the constant value is maintained until a constant supply voltage value of a power supply of the motorized system is reached.

14. Motorized system for closing a building, of the type roller shutter, according to claim 1, wherein, in the starting phase, after the constant value is reached, the constant value is maintained until a constant supply voltage value of a power supply of the motorized system is reached.

* * * * *